UNITED STATES PATENT OFFICE.

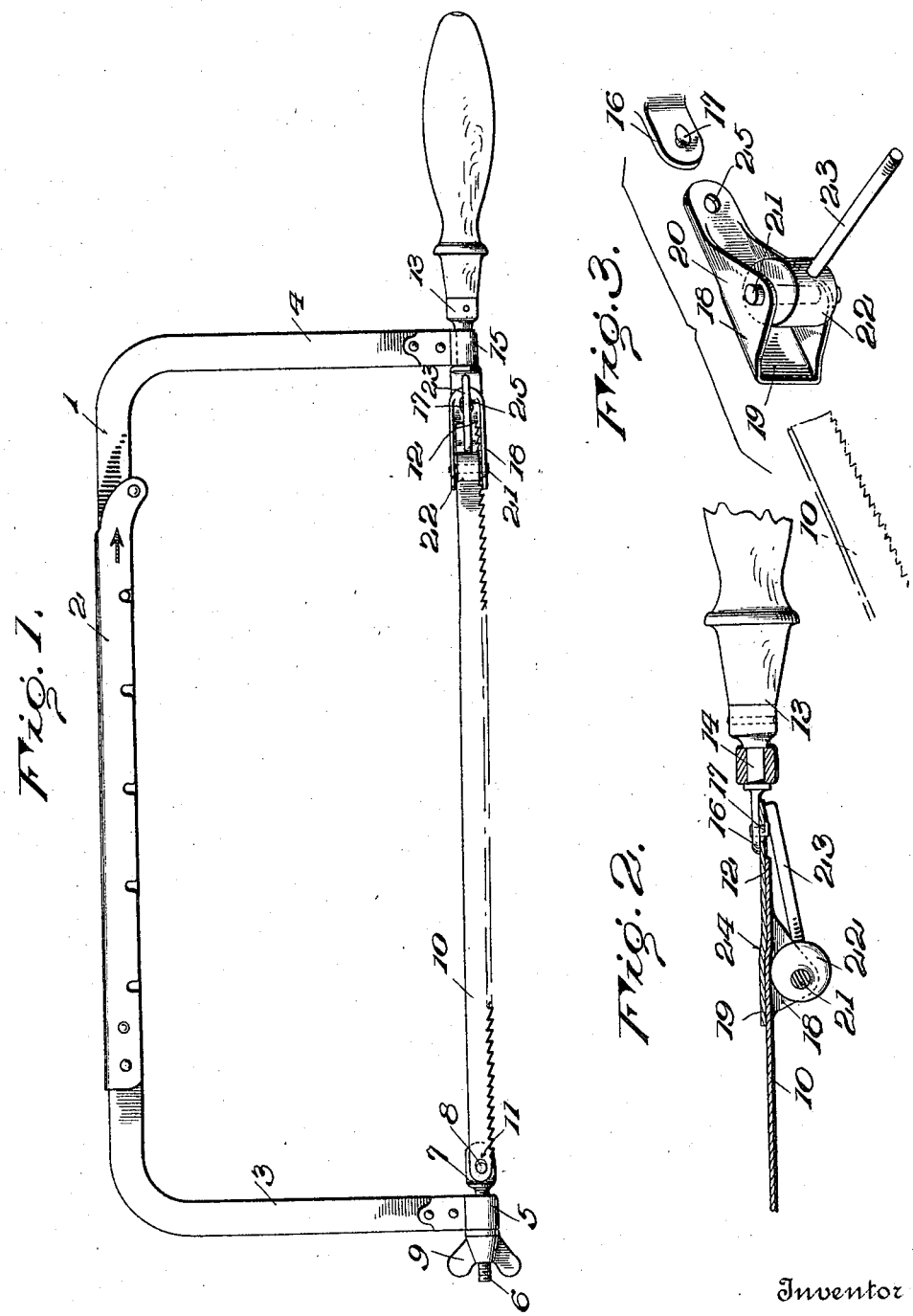

GEORGE KUCERA, OF GRAND ISLAND, NEBRASKA.

HACKSAW.

1,311,078.   Specification of Letters Patent.   Patented July 22, 1919.

Application filed June 6, 1918. Serial No. 238,517.

*To all whom it may concern:*

Be it known that I, GEORGE KUCERA, a citizen of the United States, residing at Grand Island, in the county of Hall and State of Nebraska, have invented certain new and useful Improvements in Hacksaws, of which the following is a specification.

A considerable item of expense in the use of hack saws is the replacement of broken blades. As is well-known, the frame of a hack saw is provided with blade studs which are received in openings in the ends of the blade, one of the studs being adjustable so as to provide for tensioning of the blade. When a hack saw blade breaks the break usually occurs at one or the other of these openings as the formation of the openings weakens the blade at the said openings. Heretofore broken blades have been discarded entirely as the expense of drilling another opening therein would not justify such repair of the said blade. The present invention, therefore, has as its object to provide a hack saw attachment which will provide for the utilization of broken blades and particularly blades which become broken at or adjacent the openings in their ends.

The invention contemplates the provision of a clamp adapted to frictionally firmly grip the broken end of a hack saw blade and which clamp will be adapted for application to either of the blade studs of the saw frame.

A further object of the invention is to so construct the attachment that the same may be applied to either of the said blade studs and may be manipulated to grip either end of the blade so that the blade may be utilized regardless of which end thereof has become broken off, and furthermore, so that if both ends of a blade should become broken two of the devices might be employed to permit of further use of the blade.

A further object of the invention is to so construct the clamping device that the same will securely grip the blade and more firmly bind the blade as the tension upon the blade is increased so as to positively preclude any slipping of the blade after it has been arranged within the frame and tensioned.

In the accompanying drawings:

Figure 1 is a side elevation of the attachment embodying the present invention applied to a hack saw and blade, one of which blades has been broken off near the stud opening therein;

Fig. 2 is a horizontal sectional view through the attachment, the broken end of the blade, and that arm of the saw frame to which the attachment is connected;

Fig. 3 is a perspective view of the attachment and one stud carrying portion of the saw frame, the parts being disassembled.

In the drawings, the numeral 1 indicates in general the frame of an ordinary hack saw including the usual back 2 and front and rear arms 3 and 4, respectively. The front arm is provided at its lower end with a bearing sleeve 5 through which is fitted the threaded stem 6 of a head 7 provided with the usual laterally projecting blade stud 8, a wing nut 9 being threaded on to the stem and bearing against the forward end of the sleeve 5 and adapted to be tightened so as to tension the blade after the blade has been arranged within the frame. The blade is indicated by the numeral 10, and in its original condition is formed near each end with a stud receiving opening 11. In the example illustrated, however, the rear end of the blade has been broken off, as indicated by the numeral 12, although the forward end is intact and the opening 11 receives the stud 8 so as to connect the said end of the blade with the forward arm of the saw frame. The handle of the saw is indicated in general by the numeral 13 and the same includes a stem 14 extending through a sleeve 15 at the lower end of the frame arm 4 and this stem or shank includes an ear 16 provided with a blade stud 17 corresponding to the stud 8 and with which the rear end of the blade would be connected if it were not for the fact that it has been broken off as before stated.

The device embodying the present invention is in the nature of a clamp indicated in general by the numeral 18 and this clamp includes a connecting portion 19 and spaced ears 20 which project at right angles from one face of the said connecting portion 19 and which occupy parallel planes. A pivot pin 21 is secured at its ends in openings formed in the ears 20 and rotatably mounted upon this pin is an eccentric clamping head 22 which when rotated is designed to coact with that face of the portion 19 from which the ears 20 project, as clearly shown in Fig. 2 of the drawings, so as to clamp the blade 10 near its broken end 12. In order that the clamping head 22 may be rotated upon its pin 21, a suitable finger lever 23 is secured at its inner end to the head and extends radially with relation to the axis of the said head. In order that the blade may be more firmly secured by the clamping head, it is preferable that the connecting portion 19 be slightly offset at a point opposite the clamp head 22 and as indicated by the numeral 24. At one end, the said portion 19 is formed with an opening 25 designed to receive the stud 17 or the stud 8 as the case may be. For example, in the use of the device as illustrated in Fig. 1 of the drawings and where the rear end of the blade has been broken off, the forward end of the blade will be engaged with the blade stud 8, the blade stud 17 will be fitted through the opening 25, the broken end of the blade will be inserted between the portion 19 of the clamp and the clamp head 22, and the finger lever 23 will then be manipulated so as to cause the head to firmly bind the said end of the blade. The wing nut 9 may then be rotated so as to tension the said blade. Should the forward end of the blade be broken off, or should it be found desirable to apply the attachment to the forward arm 3 rather than to the rear arm 4, the attachment is, of course, engaged with the stud 8 whereupon the opposite end of the blade would be engaged with the stud 17. As stated above, when both ends of the blade are broken off, one of the attachments may be applied to the stud 8 and the other to the stud 17, and the two broken ends of the blades clamped by the respective attachments.

Having thus described the invention, what is claimed as new is:

A saw-end-holding device for hack saws comprising a base plate provided at one end with an opening to engage over the saw stud of the hack saw and provided adjacent its opposite end with laterally projecting ears at its upper and lower edges, an eccentric clamping head mounted between said ears to engage against flat outer face of the saw blade, and a handle extending radially from said head, the base plate being offset opposite the clamping head whereby the blade end engaged between the base plate and the clamping head will be flexed when clamped by said head.

In testimony whereof I affix my signature.

GEORGE KUCERA.

Copies of this patent may be obtained for five cents each, by addressing the "Commissioner of Patents, Washington, D. C."